United States Patent
Hasan et al.

(10) Patent No.: US 10,751,955 B2
(45) Date of Patent: Aug. 25, 2020

(54) UNITIZED COMPOSITE STRUCTURE MANUFACTURING SYSTEM

(71) Applicant: The Boeing Company, Chicago, IL (US)

(72) Inventors: Zeaid F. Hasan, St. Louis, MO (US); Michael Palmore Matlack, Saint Charles, MO (US); Emily E. McDonald, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 15/483,312

(22) Filed: Apr. 10, 2017

(65) Prior Publication Data

US 2018/0290403 A1    Oct. 11, 2018

(51) Int. Cl.
*B29C 70/44*        (2006.01)
*B29C 70/54*        (2006.01)
*B29C 33/30*        (2006.01)

(52) U.S. Cl.
CPC ............ *B29C 70/44* (2013.01); *B29C 70/54* (2013.01); *B29C 33/305* (2013.01)

(58) Field of Classification Search
CPC ...... B29C 70/44; B29C 33/305; B29C 70/541
See application file for complete search history.

(56) References Cited

U.S. PATENT DOCUMENTS

| | | | |
|---|---|---|---|
| 5,071,506 A * | 12/1991 | Nelson | B29C 33/40 |
| | | | 156/156 |
| 6,638,466 B1 | 10/2003 | Abbott | |
| 9,381,704 B2 | 7/2016 | Hollensteiner et al. | |
| 2012/0288655 A1 * | 11/2012 | Havens | B29C 33/485 |
| | | | 428/36.9 |
| 2012/0312848 A1 | 12/2012 | Delusky et al. | |
| 2015/0013894 A1 | 1/2015 | Matsen et al. | |
| 2015/0158212 A1 * | 6/2015 | Voigt | B29C 70/46 |
| | | | 264/258 |
| 2016/0001472 A1 | 1/2016 | Downs et al. | |
| 2016/0031167 A1 | 2/2016 | Dull et al. | |

OTHER PUBLICATIONS

Extended European Search Report, dated Sep. 13, 2018, regarding Application No. EP18162961.9, 8 pages.
Xu et al., "Simulation and optimization of mandrel heating process for composite shells using internal heat-curing method," Journal of Reinforced Plastics and Composites, vol. 31, Issue 3, Feb. 2012, pp. 133-143.
Ramakrishnan et al., "Curing of Composites Using Internal Resistive Heating," Journal of Manufacturing Science and Engineering, vol. 122, Issue 1, Feb. 2000, pp. 124-131.

* cited by examiner

*Primary Examiner* — Matthew J Daniels
(74) *Attorney, Agent, or Firm* — Yee & Associates, P.C.

(57) ABSTRACT

A method and apparatus for a composite structure manufacturing system. The system comprises a heating system and one or more smart bladders that encompass the heating system. The heating system and the one or more smart bladders form a curing tool defining a volume for the composite structure when one or more smart bladders in the one or more smart bladders is in a rigid state.

33 Claims, 13 Drawing Sheets

UNITIZED COMPOSITE STRUCTURE MANUFACTURING SYSTEM

BACKGROUND INFORMATION

1. Field

The present disclosure relates generally to manufacturing products, and in particular, to manufacturing aircraft. Still more particularly, the present disclosure relates to a method and apparatus for fabricating a composite structure for an aircraft using a unitized composite structure manufacturing system.

2. Background

Aircraft are being designed and manufactured with greater and greater percentages of composite materials. Composite materials may be used in aircraft to decrease the weight of the aircraft. This decreased weight improves performance features, such as payload capacity and fuel efficiency.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Using composite materials to create aerospace composite structures may allow for portions of an aircraft to be manufactured in larger pieces or sections. For example, a fuselage in an aircraft may be created in cylindrical sections to form the fuselage of the aircraft. Other examples include, without limitation, wing sections joined to form a wing or stabilizer sections joined to form a stabilizer.

In manufacturing composite structures, layers of composite material may be laid up on a tool. The layers of composite material may be comprised of fibers in sheets. These sheets may take the form of, for example, without limitation, fabrics, tape, tows, or other suitable configurations for the sheets. In some cases, resin may be infused or pre-impregnated into the sheets. These types of sheets are commonly referred to as "prepreg".

The different layers of prepreg may be laid up in different orientations and different numbers of layers may be used depending on the desired thickness of the composite structure being manufactured. These layers may be laid up by hand or using automated lamination equipment, such as a tape laminating machine or a fiber placement system. After the different layers have been laid up on the tool, the layers may be consolidated and cured upon exposure to temperature and pressure, thus forming the final composite structure.

In manufacturing composite wings, an effort is present to reduce the cost as compared to current processes. One manner in which the cost may be reduced is by building a unitized wing structure as a continuous wing. In other words, the wing may be formed by curing various structures for the wing in a single step. For example, upper and lower skins are connected by sheer webs, all of which may be co-cured in a single step. This process in the tooling of structures for curing components in a single step to form a unitized wing may be more complex than desired. It is also desirable to reduce the number of fasteners needed to assemble a wing and the number of fastened joints in the wing to reduce weight and the time and effort needed to install the fasteners.

Therefore, it would be desirable to have a method and apparatus that take into account at least some of the issues discussed above, as well as other possible issues. For example, it would be desirable to have a method and apparatus that overcome a technical problem with curing complex composite structures, such as unitized composite structures.

SUMMARY

An embodiment of the present disclosure provides for a composite structure manufacturing system. The system comprises a heating system and one or more smart bladders that encompass the heating system. The heating system and the one or more smart bladders form a curing tool defining a volume for the composite structure when one or more smart bladders in the one or more smart bladders is in a rigid state.

Another embodiment of the present disclosure provides a method for manufacturing a composite structure. The method comprises positioning uncured composite components around one or more smart bladders in a curing tool to form an uncured composite structure. The method generates heat using a heating system in the curing tool while the one or more smart bladders is in a rigid state such that the heat has a thermal profile for curing the uncured composite structure during a curing operation to form the composite structure.

Yet another embodiment of the present disclosure provides for a composite structure manufacturing system. The composite structure manufacturing system comprises a shell, one or more smart bladders in which the uncured composite components are position around the one or more smart bladders, a heating system, a frame, and a slip sheet. The shell is configured to receive uncured composite components and a curing tool, wherein the shell is an outer mold line tool. The heating system comprises one or more heating elements configured to generate heat and a heat distribution system that distributes the heat with a thermal profile. A temperature controller is connected to at least one of the one or more heating elements or the heat distribution system. The heating system is configured to generate the heat with the thermal profile for curing the uncured composite structure during a curing operation. The one or more smart bladders are in a rigid state to form a composite structure. The thermal profile for the heat causes the uncured composite components for the composite structure to have one or more temperatures selected to cure the uncured composite structure. The frame is configured to hold the heating system. The frame comprises a first rack that holds a first end and a second end of the one or more heating elements within an interior of the shell and a second rack connected to the shell that holds the first rack within the interior of the shell. The one or more smart bladders have a structure that encompasses the heating system in which the one or more smart bladders and the frame with the heating system are configured to be received within the interior of an uncured composite structure. The heating system, the frame, and the one or more smart bladders form the curing tool that is an inner mold line tool that defines a volume for the composite structure, when the one or more smart bladders are in a rigid state. The slip sheet is located between a first portion of the one or more uncured composite components and a second portion of the one or more uncured composite components in the uncured composite structure. The first portion of the one or more uncured composite components and the second portion of the one or more uncured composite components are co-cured, without being attached to each other in forming the composite structure. A pressure is applied to the uncured composite components within the shell.

Another embodiment of the present disclosure provides a method for manufacturing a composite structure. The method comprises positioning uncured composite components around a curing tool to form an uncured composite structure. The method positions the uncured composite components and an inner mold line tool in a shell, wherein the shell is an outer mold line tool. The method comprises generating heat using the heating system in the curing tool while one or more smart bladders are in the rigid state. The heat has the thermal profile for curing the uncured composite structure during the curing operation to form the composite structure. The thermal profile for the heat causes the uncured composite components for the composite structure to have one or more temperatures selected to cure the uncured composite structure. The method comprises distributing the heat using a heat distribution system that distributes the heat with the thermal profile. The method also comprises controlling a temperature with a temperature controller connected to at least one of the one or more heating elements or the heat distribution system. The method comprises holding one or more heating elements within the shell using a frame comprising a first rack that holds a first end and a second end of the one or more heating elements within an interior of a shell and a second rack connected to the shell that holds the first rack within the interior of the shell. The method defines a volume for the composite structure using one or more smart bladders in the curing tool in which the heating system, the frame, and the one or more smart bladders form the curing tool.

A further embodiment of the present disclosure provides a method for manufacturing a composite structure. The method comprises positioning uncured composite components around one or more smart bladders in a rigid state in a curing tool to form an uncured composite structure. The method also comprises positioning a slip sheet located between a first portion of the one or more uncured composite components and a second portion of the one or more uncured composite components in the uncured composite structure such that the first portion of the one or more uncured composite components and the second portion of the one or more uncured composite components are isolated from direct contact with each other. The method comprises generating heat using a heating system in the curing tool while the one or more smart bladders are in the rigid state such that the heat has a thermal profile for curing the uncured composite structure during a curing operation to form the composite structure. The first portion of the one or more uncured composite components and the second portion of the one or more uncured composite components are co-cured without being attached to each other in forming the composite structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that creating a unitized structure involves curing the different components in a single step. For example, the illustrative embodiments recognize and take account that a unitized composite wing structure may have an upper skin, a lower skin, and structures to which the skins are attached. The illustrative embodiments recognize and take account that the structures may be cured as a single structure or maybe co-cured and bonded to each other.

The illustrative embodiments recognize and take account that with current processes, individual parts are bagged and cured in an autoclave. Further, the illustrative embodiments recognize and take into account that if a unitized structure is manufactured, the unitized structure may be placed in an autoclave as part of the curing process. The illustrative embodiments recognize and take into account that with a large structure, bagging the structure may result in rework and material waste. Also with a large structure, the illustrative embodiments recognize and take into account that some autoclaves may be unable to receive a large structure for curing. Thus, the number of autoclaves available may be lower than desired. The illustrative embodiments recognize and take account that the need for an autoclave may increase the cost and reduce the speed at which composite wings may be manufactured, with the limitations to accessing an autoclave being a bottleneck.

Thus, the illustrative embodiments provide a method and apparatus for manufacturing composite structures. In one illustrative example, a composite structure manufacturing system may comprise a heating system, a frame, and one or more smart bladders. The frame may be configured to hold the heating system. The one or more smart bladders may encompass the heating system. The one or more smart bladders and the frame, with the heating system, are configured for positioning uncured composite components around the one or more smart bladders. The one or more uncured composite components form an uncured composite structure. The heating system may be configured to generate heat with a thermal profile for curing the uncured composite structure during a curing operation to form the composite structure.

Figure 1:
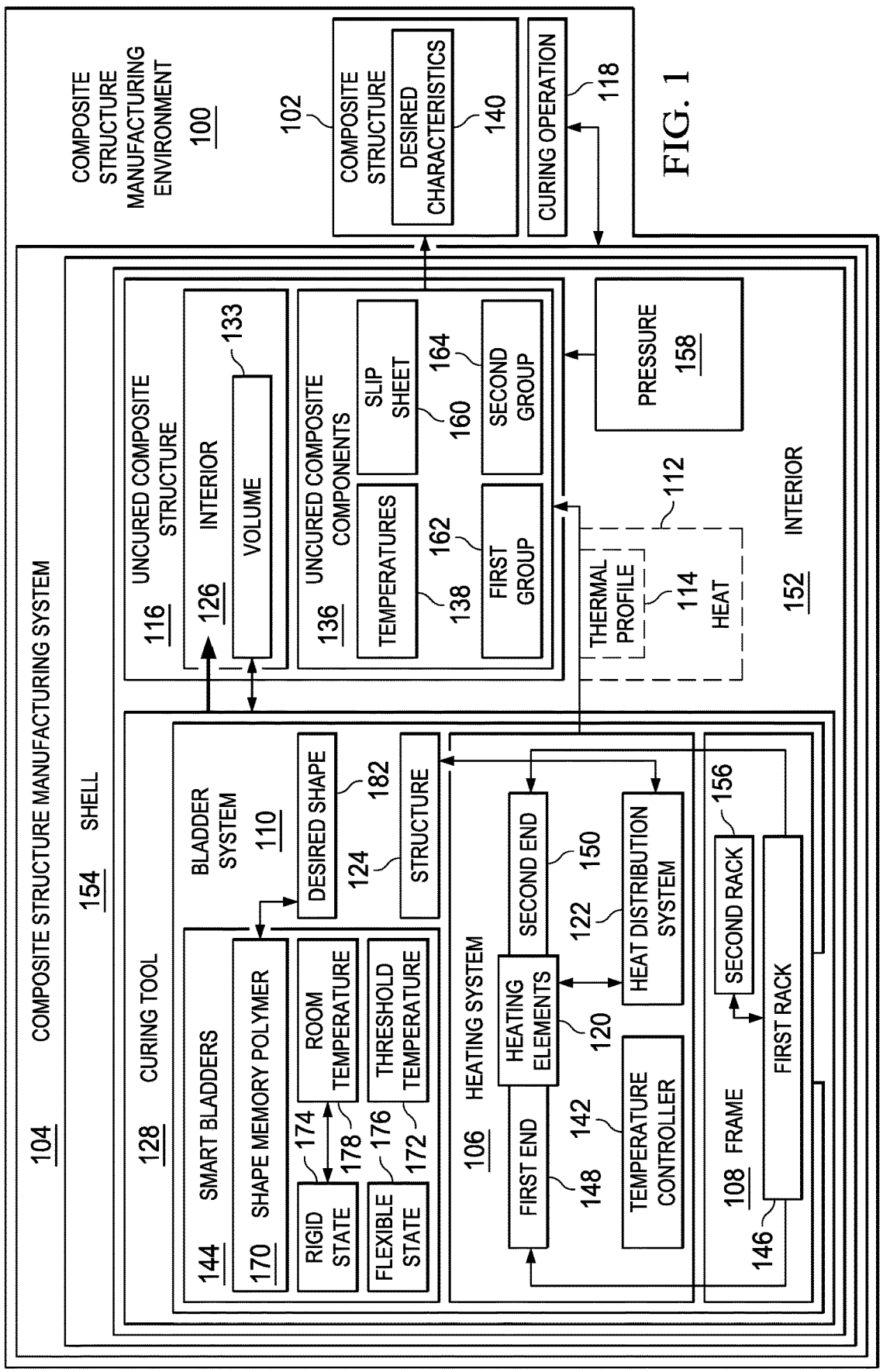
FIG. 1 is an illustration of a block diagram of a composite structure manufacturing environment in accordance with an illustrative embodiment.

With reference now to the figures, and in particular, with reference to FIG. 1, an illustration of a block diagram of a composite structure manufacturing environment is depicted in accordance with an illustrative embodiment. In this illustrative example, composite structure manufacturing environment 100 may be an environment in which composite structure 102 is manufactured. As depicted, composite structure 102 may be manufactured using composite structure manufacturing system 104.

In this illustrative example, composite structure manufacturing system 104 may include a number of different components. As depicted, these components may comprise heating system 106, frame 108, and bladder system 110.

In this illustrative example, heating system 106 may be configured to generate heat 112 with thermal profile 114 for curing uncured composite structure 116 during curing operation 118 by composite structure manufacturing system 104 to form composite structure 102. In this illustrative example, composite structure 102 may take various forms. For example, composite structure 102 may be selected from a group comprising a united composite structure, a wing, a horizontal stabilizer, a vertical stabilizer, an engine housing, a wing box, a control surface, a fuselage section, or some other type of composite structure. Heat 112 may aid in consolidating uncured composite components 136 in forming composite structure 102.

As depicted, heating system 106 may include one or more heating elements 120 and heat distribution system 122. The one or more heating elements 120 may take various forms. For example, heating elements 120 may be selected from at least one of an infrared heater, an electric heater, an induction heater, a tube through which a heated fluid flows, or some other type of element that generates heat 112 for curing operation 118.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In this illustrative example, heat distribution system 122 may distribute heat 112 having thermal profile 114. Heat distribution system 122 may take various forms depending on the particular implementation. For example, when the one or more heating elements 120 includes a tube through which heat 112 flows as a heated fluid, such as heated air, heat distribution system 122 may take the form of holes in the tube. As another illustrative example, heat distribution system 122 also may be selected from at least one of a fin, a radiating structure, or some other suitable type of mechanism that distributes heat 112 with thermal profile 114.

As depicted, frame 108 may be configured to hold heating system 106. For example, frame 108 may hold the one or more heating elements 120 in desired positions for performing curing operation 118 for curing uncured composite structure 116 to form composite structure 102. The one or more heating elements 120 may aid in consolidation of uncured composite structure 116.

In the illustrative example, bladder system 110 may encompass heating system 106. These components may form curing tool 128. As depicted, curing tool 128 may be configured to be received within interior 126 of uncured composite structure 116. Bladder system 110 may fit around frame 108.

As depicted, bladder system 110 may be comprised of one or more smart bladders 144. As depicted, the one or more smart bladders 144 may be comprised of a material such as shape memory polymer 170.

In this illustrative example, shape memory polymer 170 is a material that may change rigidity in response to a change in a parameter, such as temperature. For example, the one or more smart bladders 144 may have rigid state 174 and flexible state 176. Rigid state 174 may be present at room temperature 178, and when heated above threshold temperature 172, the one or more smart bladders 144 may transition to flexible state 176. Threshold temperature 172 may be some temperature above room temperature 178. Threshold temperature 172 also may be above temperatures 138 used in curing operation 118.

In flexible state 176, the one or more smart bladders 144 may be shaped to desired shape 182. Desired shape 182 may be a shape for laying up uncured composite components 136 to form uncured composite structure 116. The one or more smart bladders 144 may then be cooled such that the one or more smart bladders 144 return to rigid state 174. In this state, uncured composite components 136 may be laid up on the one or more smart bladders 144. Thus, bladder system 110 with the one or more smart bladders 144 in rigid state 174 may be used to layup uncured composite components 136 that form uncured composite structure 116. When in rigid state 174, the one or more smart bladders 144 function as inner mold line tools upon which uncured composite components 136 may be positioned or laid up.

In this illustrative example, heating system 106, frame 108, and bladder system 110 may form curing tool 128. Curing tool 128 may define volume 133 of composite structure 102 when bladder system 110 is in rigid state 174.

In this illustrative example, uncured composite components 136 may be laid up on bladder system 110 in rigid state 174.

Bladder system 110 and other components of curing tool 128 may be more easily removed when bladder system 110 changes to flexible state 176. As depicted, the one or more smart bladders 144 may be elastic when in flexible state 176. For example, a vacuum may be applied to the one or more smart bladders 144 such that the one or more smart bladders 144 may be reduced in volume and more easily extracted.

In forming composite structure 102 from uncured composite structure 116, thermal profile 114 may vary depending on uncured composite components 136 present in uncured composite structure 116. Thermal profile 114 may be selected for generating heat 112 such that uncured composite components 136 have one or more temperatures 138 selected to cure uncured composite structure 116 in a desired manner to form composite structure 102 with desired characteristics 140. Desired characteristics 140 may be selected from at least one of inconsistencies within tolerance, a selected rigidity, a selected strength, or other suitable types of parameters. Examples of other parameters may include a selected stiffness, a selected resin, a degree of cure, a selected toughness, fiber to volume ratio, or other suitable parameters.

As depicted, heating system 106 may include temperature controller 142. In this illustrative example, temperature controller 142 may be connected to at least one or more heating elements 120 and heat distribution system 122. Temperature controller 142 may comprise at least one of hardware or software that may be used to control at least one of the one or more heating elements 120 or heat distribution system 122. For example, temperature controller 142 may control at least one of the temperature or the flow rate of hot air flowing through a tube, when the one or more heating elements 120 includes tubes that carry a heated fluid, such as heated air.

Further, temperature controller 142 may include sensors to measure temperatures 138 from heat 112 generated by the one or more heating elements 120. Temperature controller 142 may measure heat from other sources other than heating elements 120.

In this illustrative example, frame 108 may comprise first rack 146 that holds first end 148 and second end 150 of the one or more heating elements 120 within interior 152 of shell 154. Frame 108 also may include second rack 156 connected to shell 154 that holds first rack 146 within interior 152 of shell 154.

In this illustrative example, shell 154 may be configured to receive uncured composite components 136 and curing tool 128. With uncured composite components 136 positioned on curing tool 128, uncured composite structure 116 may be formed within shell 154.

Shell 154 may be an outer mold line tool. Further, shell 154 may be pressurized to apply pressure 158 to uncured composite structure 116 within shell 154. Pressurization may result from bagging of uncured composite structure 116 within shell 154 and applying a vacuum. In this manner, consolidation of uncured composite structure 116 may occur.

Additionally, slip sheet 160 also may be used in composite structure manufacturing system 104. Slip sheet 160 may be located between first group 162 of uncured composite components 136 and second group 164 of uncured composite components 136 in uncured composite structure 116 such that first group 162 of uncured composite components 136 and second group 164 of uncured composite components 136 are co-cured without being attached to each other in forming composite structure 102.

Slip sheet 160 may allow for first group 162 of uncured composite components 136 and second group 164 of uncured composite components 136 to be cured in a single step during curing operation 118, such that first group 162 of uncured composite components 136 and second group 164 of uncured composite components 136 are not connected to each other and such that these components may have at least one of a desired shape, fit, or other characteristics that allow for first group 162 of uncured composite components 136 and second group 164 uncured composite components 136 to be bonded to each other at a later time. Alternatively, uncured composite components 136 may be bolted, or bolted and bonded to each other at a later time.

For example, access to volume 133 may occur more easily when first group 162 of uncured composite components 136 and second group 164 of uncured composite components 136 are not attached to each of other after curing operation 118. As a result, at least one of less reworking operations, avoidance of shims, or a reduction in undesired results may occur by using slip sheet 160.

In one illustrative example, one or more technical solutions may be present that overcome a technical problem with curing complex composite structures, such as unitized composite structures. As a result, one or more technical solutions may provide a technical effect of reducing at least one of time, reworking operations, or cost in manufacturing complex composite structures, such as unitized composite wings. In this manner, a reduction in the need for fasteners, assembly time, associated rework, consumable materials, or other reductions may occur. The consumable materials may include a breather material, fluorinated ethylene propylene (FEP), bagging material, or other materials that may be used.

In the illustrative example, composite structure manufacturing system 104 may function as a unitized composite structure manufacturing system for manufacturing various unitized composite structures, such as a unitized composite wing. When using composite structure manufacturing system 104, a need to bag composite structure 102 may be avoided. Additionally, reworking of structures and material waste from issues associated with manufacturing bagging of composite structure 102 also may be avoided. Further, curing tool 128 may avoid the need for placing composite structure 102 into an autoclave. Further, with the use of curing tool 128, the time needed to cure composite structure 102 may be lower as compared to currently used processes.

The illustration of composite structure manufacturing environment 100 in FIG. 1 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, one or more curing tools, in addition to curing tool 128, may be present to form composite structure 102. In this illustrative example, the one or more heating elements 120 may be heterogeneous or homogeneous in composition. For example, the one or more heating elements 120 may include tubes that carry a heated fluid and radiating elements that generates heat from the flow of electrical current through the radiating elements. As another example, frame 108 may only include first rack 146 without using second rack 156.

As another example, curing tool 128 may be used with other types of products other than an aircraft. Curing tool 128 may be used to fabricate composite structures for other platforms such as a vehicle, a spacecraft, an automobile, a train, a building, a bridge, or other suitable products.

Figure 2:
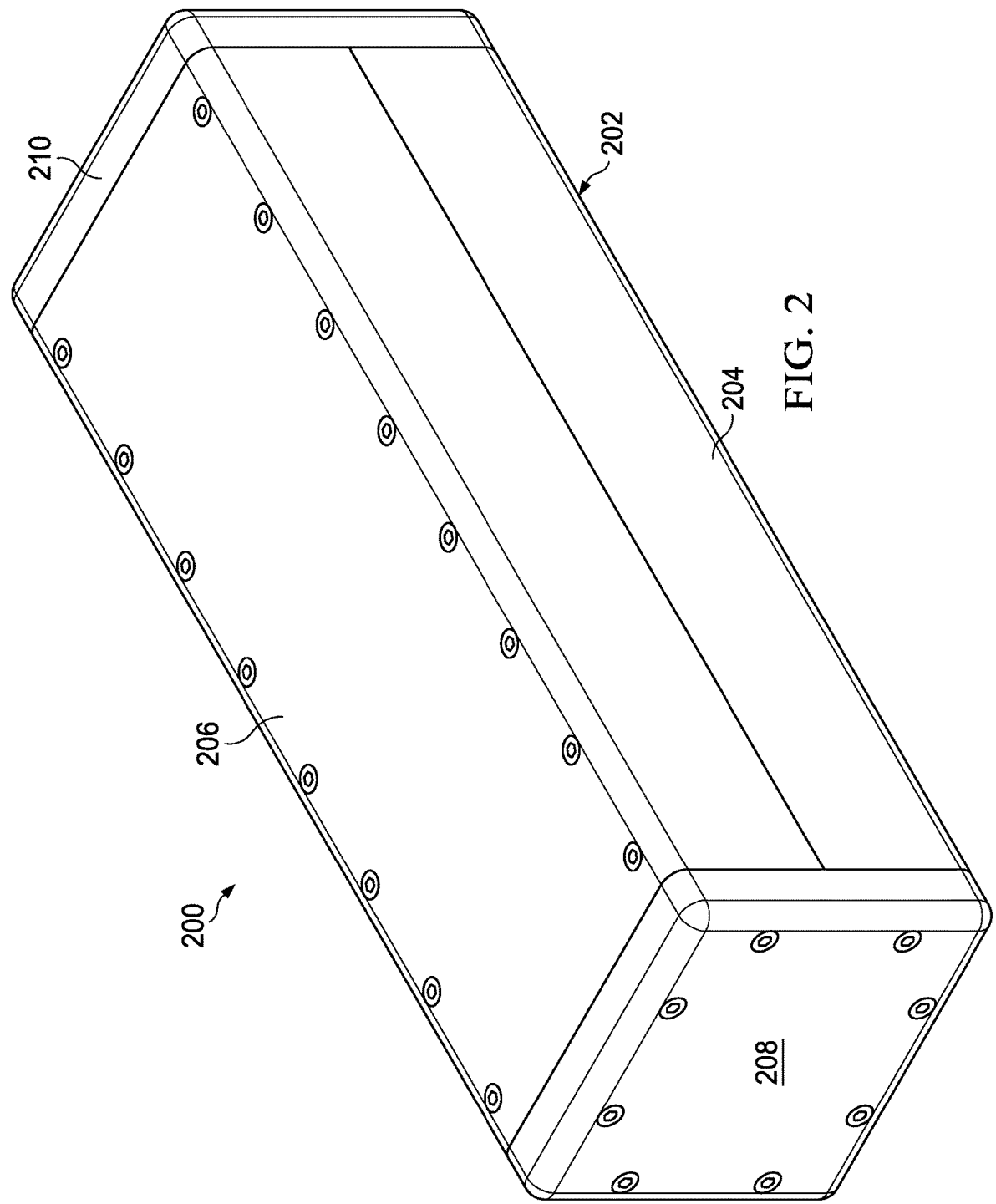
FIG. 2 is an illustration of a composite structure manufacturing system in accordance with an illustrative embodiment.

Turning now to FIG. 2, an illustration of a composite structure manufacturing system is depicted in accordance with an illustrative embodiment. Composite structure manufacturing system 200 is an example of one implementation for composite structure manufacturing system 104 shown a block form in FIG. 1.

In this depicted example, shell 202 is shown in this view. Shell 202 may have lower half 204 and upper half 206. Shell 202 may be an outer mold line tool in composite structure manufacturing system 200. First cap 208 and second cap 210 also may be present. First cap 208 and second cap 210 may be connected to shell 202. These two components may be considered part of shell 202 in some illustrative examples. These depicted components encompass other components for composite structure manufacturing system 200, not seen in this view.

Figure 3:
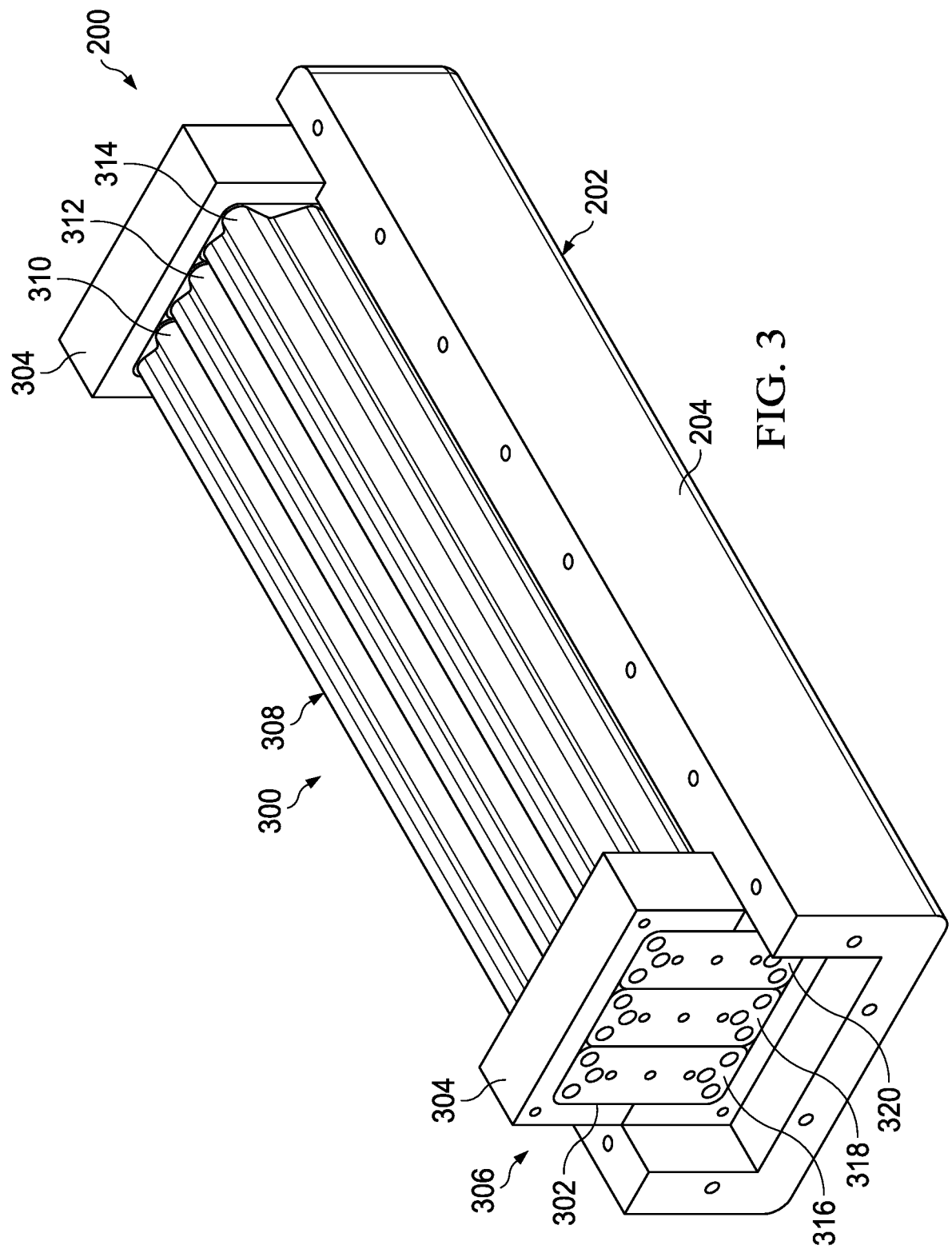
FIG. 3 is another illustration of a composite structure manufacturing system in accordance with an illustrative embodiment.

With reference to FIG. 3, another illustration of a composite structure manufacturing system is depicted in accordance with an illustrative embodiment. In this view, upper half 206, first cap 208 and second cap 210 have been removed to show other components of composite structure manufacturing system 200 located within interior 300 of shell 202.

In this view, first rack 302 and second rack 304 are seen within shell 202 and may form frame 306 in composite structure manufacturing system 200. Bladder system 308 may be held by first rack 302 within interior 300 of shell 202. First rack 302 may have three sections, section 316, section 318, and section 320. Second rack 304 may be connected to shell 202 within interior 300 of shell 202 and may hold first rack 302. Section 316, section 318, and section 320 may be end caps through which connections to bladder 310, bladder 312, bladder 314, and heating elements (not shown) encompassed by bladder 310, bladder 312, and bladder 314 may be made.

As depicted, bladder system 308 may be comprised of bladder 310, bladder 312, and bladder 314. These bladders may be inflated when performing the curing operation. The inflation of bladder 310, bladder 312, and bladder 314 when in a flexible state may press uncured composite components (not shown) laid up on these bladders against shell 202 resulting in at least one of a desired shape and surface texture.

Figure 4:
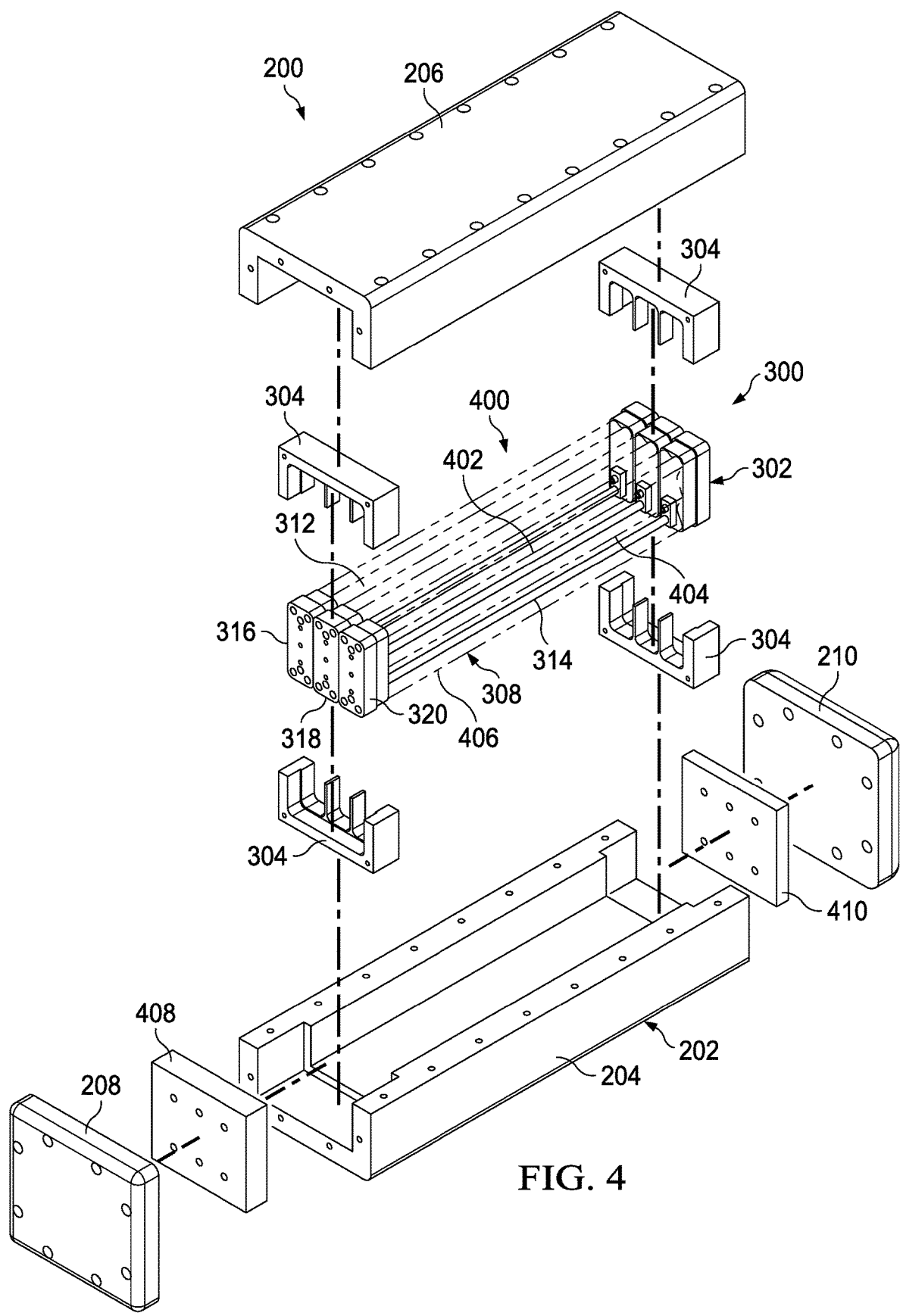
FIG. 4 is an illustration of an exploded view of a composite structure manufacturing system in accordance with an illustrative embodiment.

Turning to FIG. 4, an illustration of an exploded view of a composite structure manufacturing system is depicted in accordance with an illustrative embodiment. In this exploded view, bladder system 308 is shown in phantom such that other components in composite structure manufacturing system 200 may be seen.

In this view, heating system 400 may include heating element 402, heating element 404, and heating element 406. As shown in this view, heating system 400 may be held by first rack 302, which in turn may be held by second rack 304.

Additionally, inner cap 408 and inner cap 410 are also seen in this exploded view. Inner cap 408 and inner cap 410 may be connected to first rack 302.

The illustration of composite structure manufacturing system 200 in FIGS. 2-4 are presented for purposes of illustrating an example of a physical implementation of composite structure manufacturing system 104 shown in block form in FIG. 1. These illustrations are not meant to limit the manner in which other illustrative examples may be implemented. For example, other numbers of heating elements 120 and smart bladders 144 shown in FIG. 1 may be used in other illustrative examples.

Further, different ones of smart bladders 144 may have different shapes to create different sub-volumes within volume 133 in forming composite structure 102. Also, other components such as release films, peel plies, fluorinated ethylene propylene (FEP) layers, and other components used in forming composite structures have not been shown to avoid obscuring features of composite structure manufacturing system 200.

Figure 5:
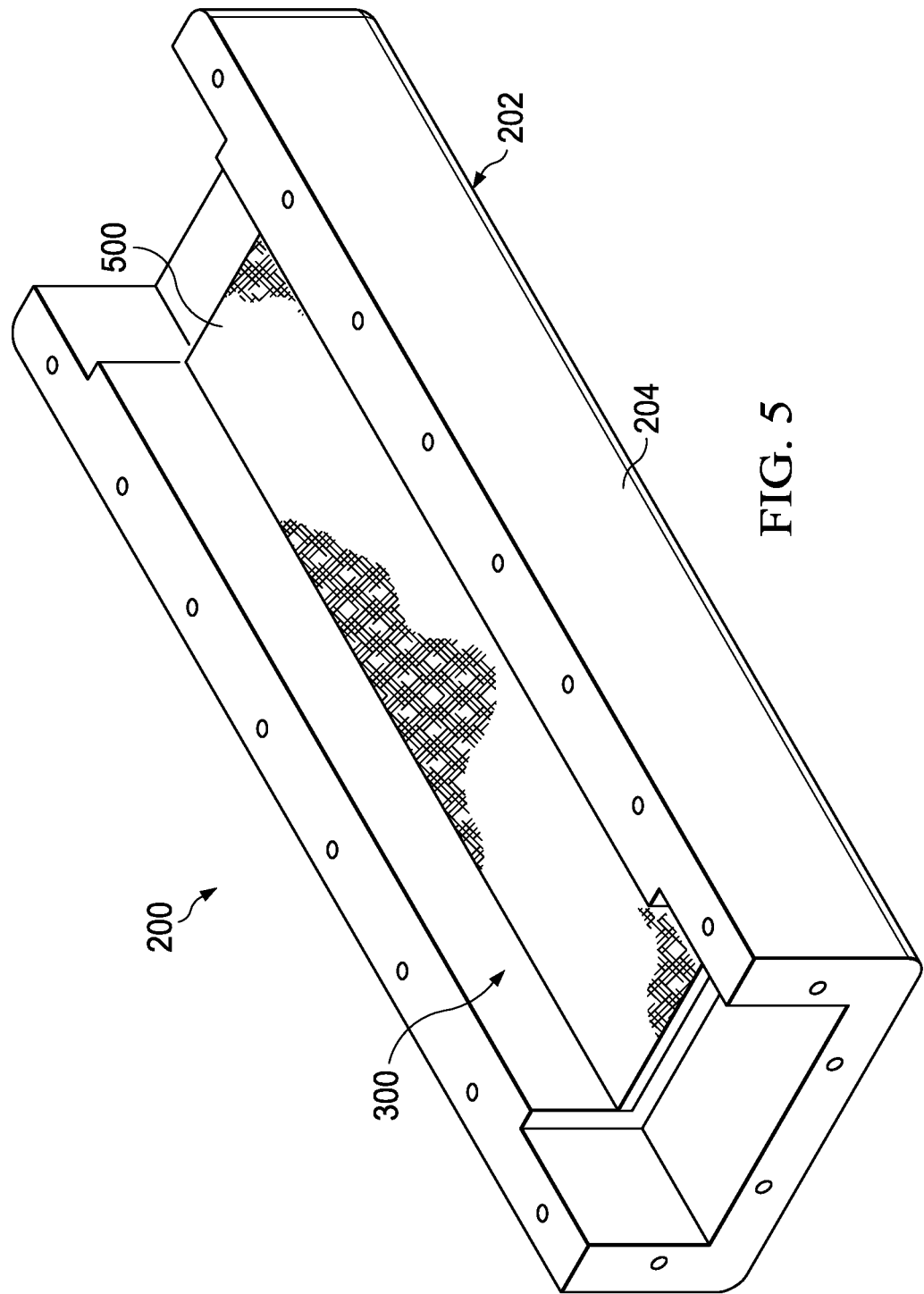
FIG. 5 is an illustration of a lower skin panel laid up in a shell in accordance with an illustrative embodiment.

With reference now to FIGS. 5-8, an illustration of a process for forming a wing is depicted in accordance with an illustrative embodiment. With reference first to FIG. 5, an illustration of a lower skin panel laid up in a shell is depicted in accordance with an illustrative embodiment. In this illustrative example, lower skin panel 500 may be shown laid up within interior 300 of lower half 204 of shell 202.

Figure 6:
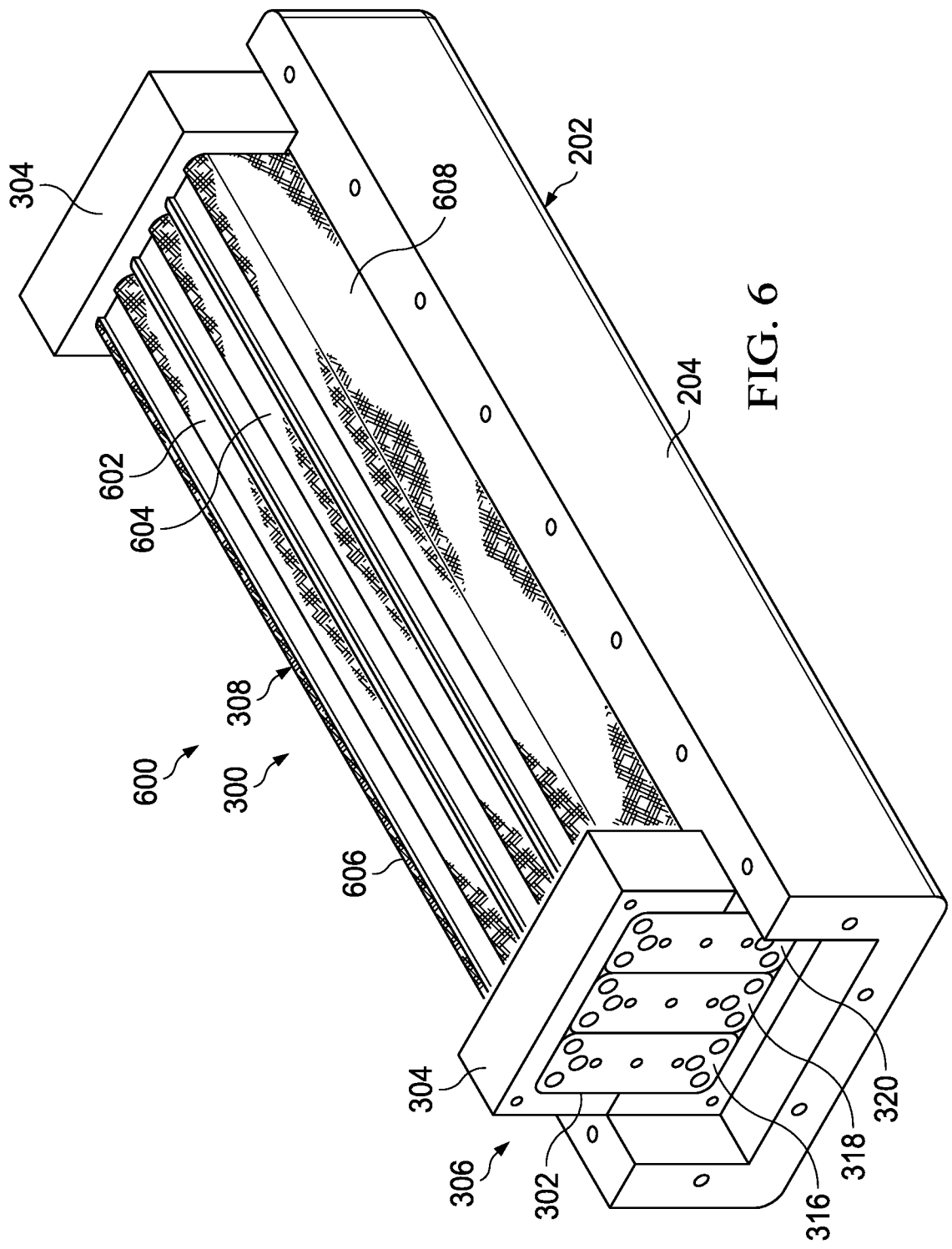
FIG. 6 is an illustration of uncured composite components laid up in a composite structure manufacturing system in accordance with an illustrative embodiment.

In FIG. 6, an illustration of uncured composite components laid up in a composite structure manufacturing system is depicted in accordance with an illustrative embodiment. As depicted, uncured composite components 600, in addition to lower skin panel 500, shown in FIG. 5, may be laid up around bladder system 308. In this illustrative example, uncured composite components 600 also may include spar 602, spar 604, aft end 606, and forward end 608, in addition to lower skin panel 500 (not shown in this view).

Figure 7:
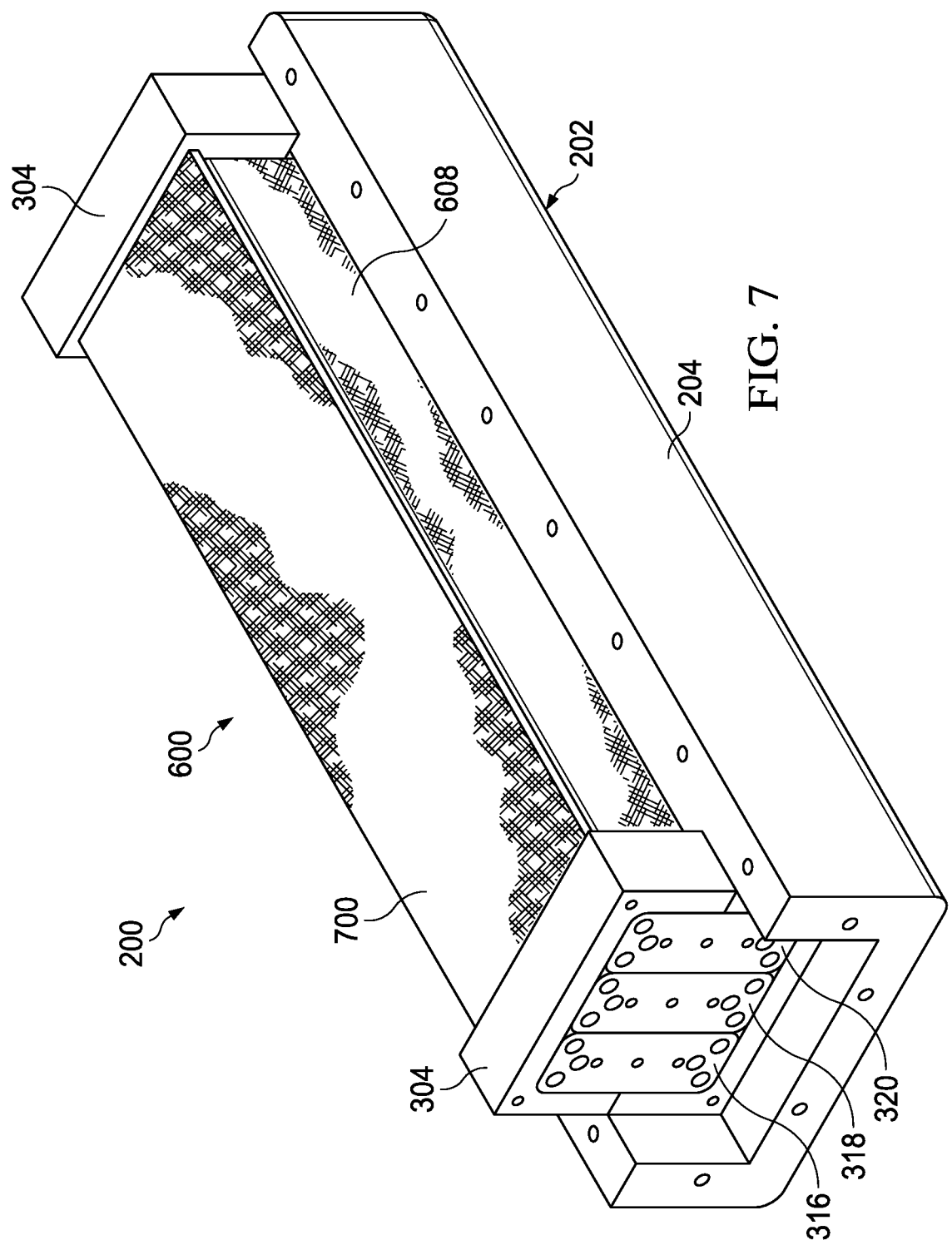
FIG. 7 is an illustration of uncured composite components in accordance with an illustrative embodiment.

With reference now to FIG. 7, an illustration of uncured composite components is depicted in accordance with an illustrative embodiment. As depicted, upper skin panel 700 may be positioned with respect to spar 602, spar 604, aft end 606, and forward end 608 shown in FIG. 6. Upper half 206 shown in FIG. 2, of shell 202 may be placed over lower half 204, and the curing operation may be performed for uncured composite components 600 in composite structure manufacturing system 200.

Figure 8:
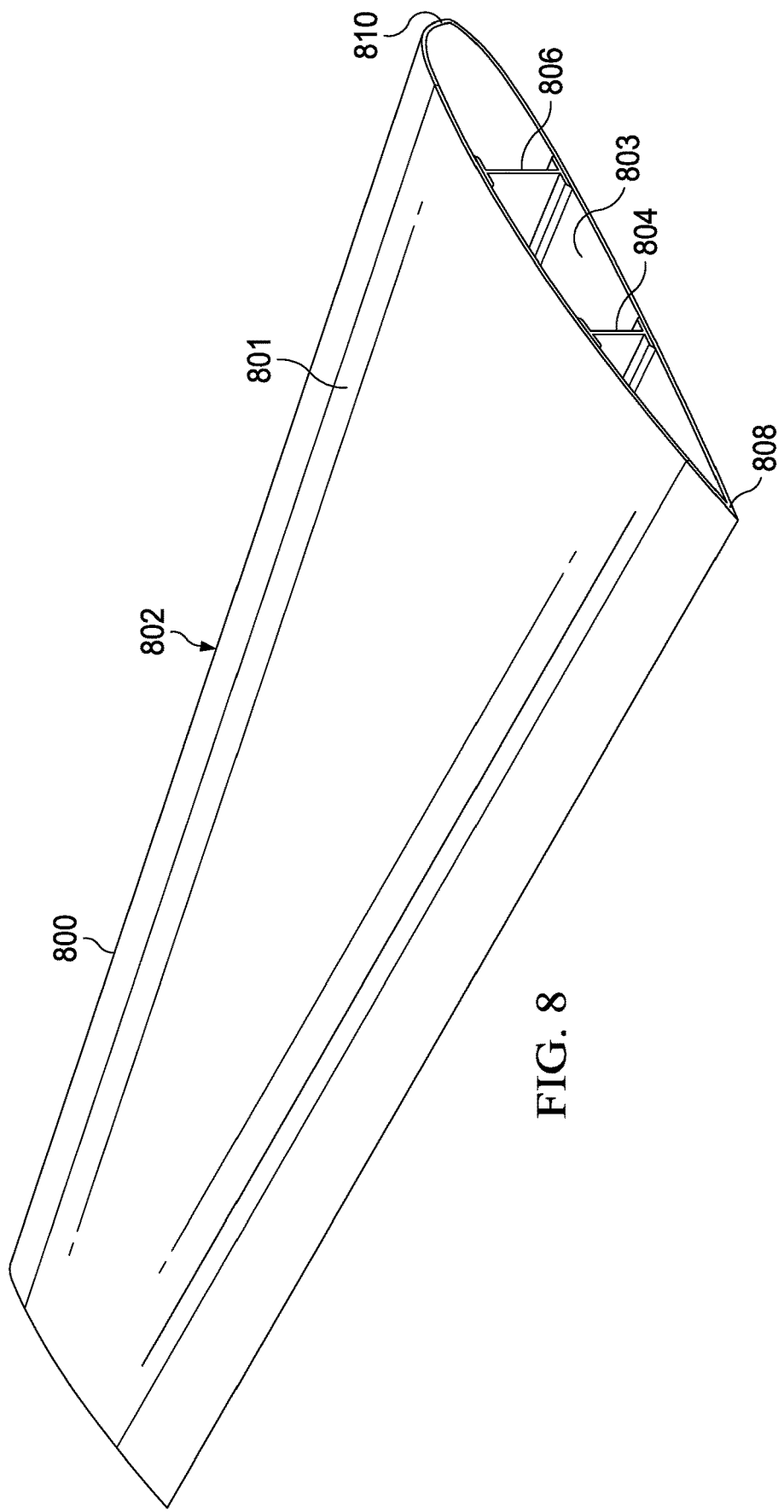
FIG. 8 is an illustration of a composite structure fabricated using a composite structure manufacturing system in accordance with an illustrative embodiment.

Turning now to FIG. 8, an illustration of a composite structure fabricated using a composite structure manufacturing system is depicted in accordance with an illustrative embodiment. As depicted, composite structure 800 may take the form of wing 802. In this illustrative example, composite structure 800 may be formed from curing uncured composite components 600 (not shown) in FIG. 7.

In this example, wing 802 comprises upper skin panel 801, lower skin panel 803, spar 804, spar 806, end 808, and end 810. These cured composite components correspond to uncured composite components such as upper skin panel 700, lower skin panel 500, spar 602, spar 604, aft end 606, and forward end 608 shown in FIGS. 5-7.

The manufacturing of wing 802 may be performed with a lower cost as compared to current processes in the illustrative examples. As depicted, the curing of wing 802 may be performed without using an autoclave.

Figure 9:
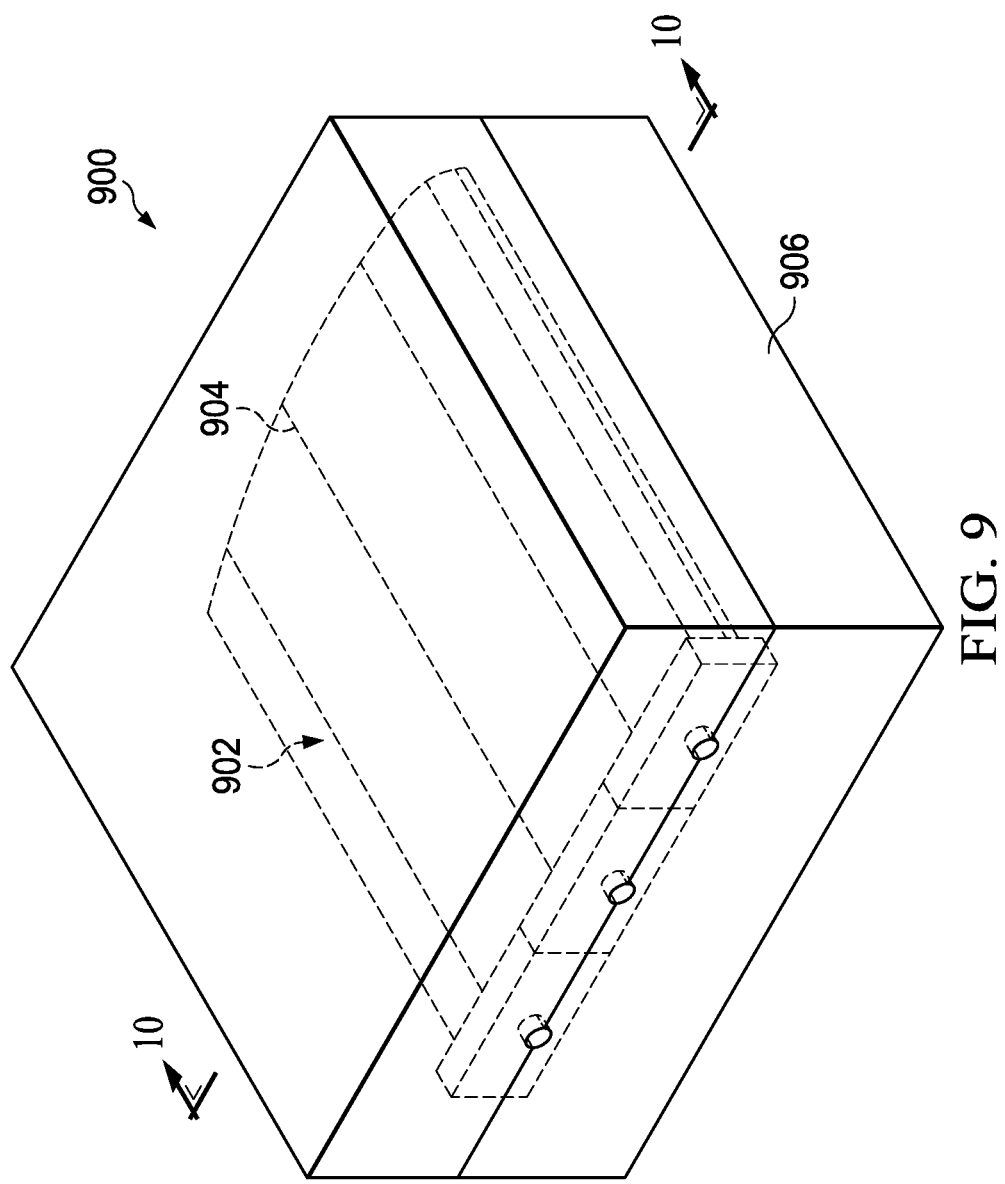
FIG. 9 is an illustration of a composite structure manufacturing system in accordance with an illustrative embodiment.

Turning to FIG. 9, an illustration of a composite structure manufacturing system is depicted in accordance with an illustrative embodiment. In this illustrative example, composite structure manufacturing system 900 may be used to manufacture wing 902. As depicted, uncured components 904 for wing 902 are located within shell 906 of composite structure manufacturing system 900.

Figure 10:
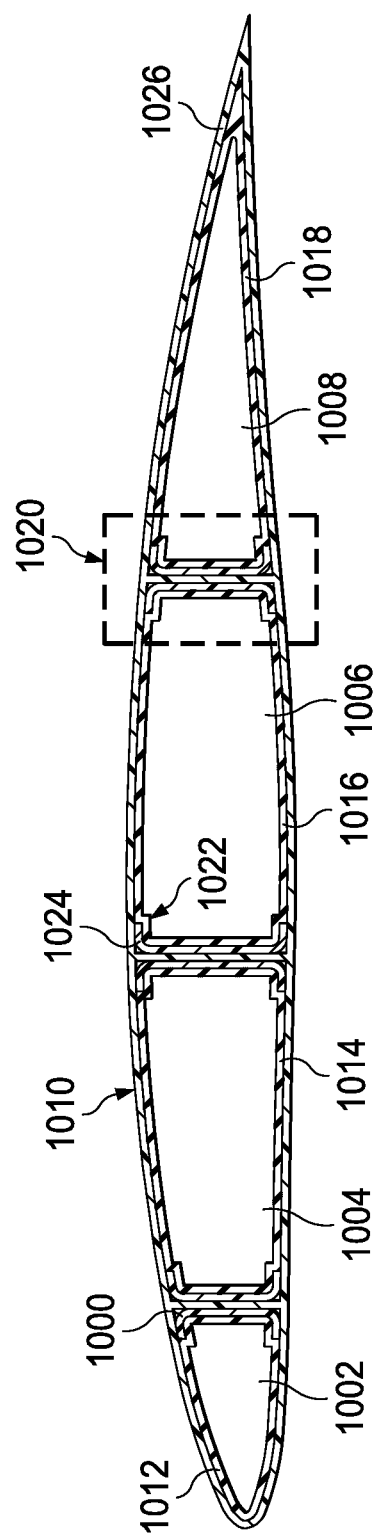
FIG. 10 is an illustration of uncured composite components within a composite structure manufacturing system in accordance with an illustrative embodiment.

With reference to FIG. 10, an illustration of uncured composite components within a composite structure manufacturing system is depicted in accordance with an illustrative embodiment. In this example, a cross-sectional view of composite structure manufacturing system 900 is shown taken along lines 10-10 in FIG. 9. In this depicted example, volume 1000 may be present within wing 902 shown in FIG.

9. Volume 1000 may include sub-volume 1002 sub-volume 1004, sub-volume 1006, and sub-volume 1008. Volume 1000 may be defined by bladder system 1010 within composite structure manufacturing system 900 shown in FIG. 9. This example, bladder system 1010 includes bladder 1012, bladder 1014, bladder 1016, and bladder 1018. Portion 1020 of this cross-sectional view is shown in more detail in FIG. 11 below.

As depicted, these bladders in bladder system 1010 may be in a rigid state with a shape for bends and edges that may be present. For example, in a rigid state, bladder 1018 may have a shape that conforms to trailing edge 1026. As another example, bladder 1016 has bend 1022 that conforms to bend 1024 in wing 902.

Figure 11:
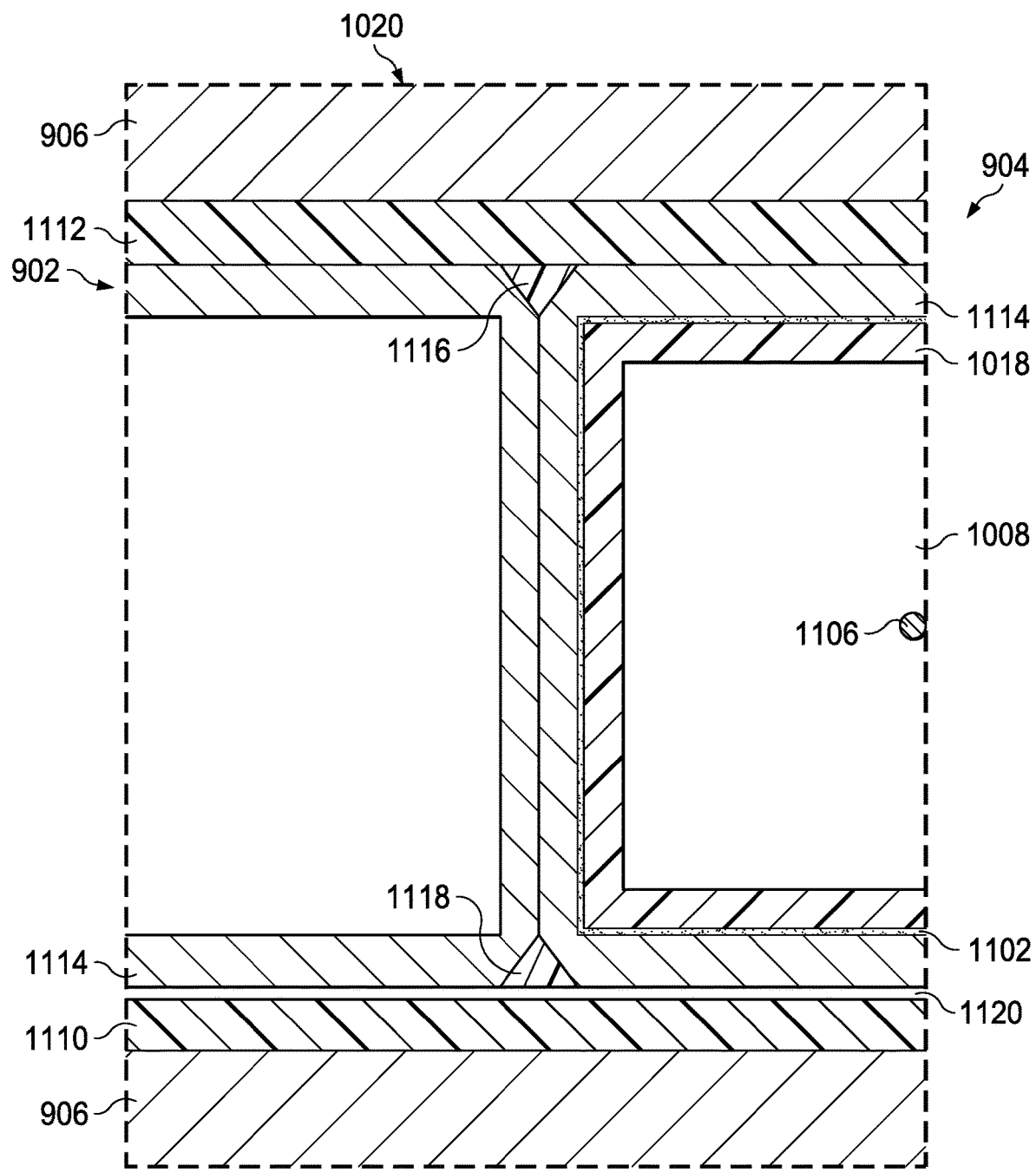
FIG. 11 is a more detailed illustration of a portion of a composite structure manufacturing system with a wing in accordance with an illustrative embodiment.

With reference now to FIG. 11, a more detailed illustration of a portion of composite structure manufacturing system with a wing is depicted in accordance with an illustrative embodiment. In this figure, an enlarged view of a portion 1020 in FIG. 10 is shown.

In this view, release layer 1102 is shown on bladder 1018 in this figure. Release layer 1102 may be comprised of at least one of a tool tack, a release tape, or release film.

In this illustrative example, uncured components 904 may include lower skin 1110, upper skin 1112, spar 1114, radius filler 1116, and radius filler 1118.

When in a rigid state, bladder 1018 may define sub-volume 1008 for wing 902. Heating element 1106 also may be seen in this view.

In this illustrative example, slip sheet 1120 may be an optional component that may be used to avoid lower skin 1110 from becoming attached to spar 1114 during co-curing of these uncured components. With slip sheet 1120, lower skin 1110 may be bonded to spar 1114 at a later time.

With the use of slip sheet 1120, lower skin 1110 and spar 1114 may have at least one of a shape or fit that may allow bonding of these components to each other more easily. For example, inserting shims, sanding, or other reworking operations for these components may be reduced or avoided.

The illustration of composite structure manufacturing system 200 in FIGS. 2-7 and wing 802 in FIG. 8 are provided as an illustrative of examples and not meant to limit the manner in which other illustrative examples may be implemented. The illustrative embodiments recognize and take account that across the aerospace industry an effort is present to build wings for commercial and military applications that are lower cost compared to the current processes. The illustrative embodiments recognize and take account that one way to achieve this goal is by building unitized wing structures such as tip-to-tip wings.

The illustrative embodiments recognize and take account that composite structure manufacturing system 104 shown in block form in FIG. 1 and composite structure manufacturing system 200 shown in FIGS. 2-7 may provide tooling to enable such fabrication to reduce cost by faster fabrication rates and lower rework. For example, in other illustrative examples, a unitized wing may be manufactured using composite structure manufacturing system 104 and composite structure manufacturing system 200 configured for manufacturing a unitized wing, instead of wing 802, such that all structures for the unitized wing are formed at the same time.

Figure 12:
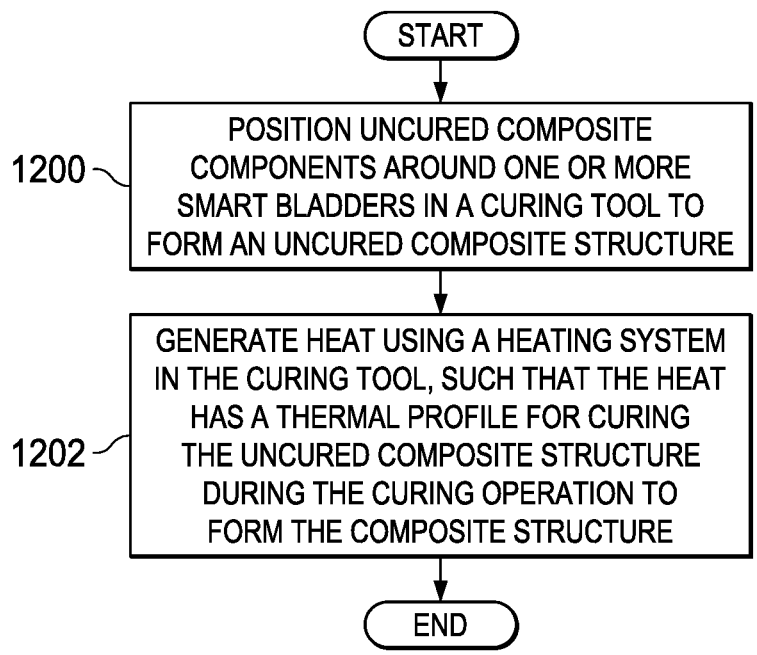
FIG. 12 is an illustration of a flowchart of a process for manufacturing a composite structure in accordance with an illustrative embodiment.

Turning next to FIG. 12, a flowchart of a process for manufacturing a composite structure is depicted in accordance with an illustrative embodiment. The process illustrated in FIG. 12 may be implemented using composite structure manufacturing system 104 in FIG. 1 to manufacture composite structure 102 in FIG. 1.

The process may begin by positioning uncured composite components 136 around one or more smart bladders 144 in curing tool 128 to form uncured composite structure 116 (operation 1200). Uncured composite components 136 may be layers of uncured composite materials layered to form uncured composite components 136 for uncured composite structure 116. In operation 1200, uncured composite components 136 may be positioned between curing tool 128 and shell 154 such that uncured composite components 136 are sandwiched between curing tool 128 and shell 154.

The process may then generate heat 112 using heating system 106 in curing tool 128 and such that heat 112 has thermal profile 114 for curing uncured composite structure 116 during curing operation 118 to form composite structure 102 (operation 1202). The process terminates thereafter. Curing operation 118 may be performed without an autoclave. Heat 112 may be generated using heating system 106 and a manner that avoids the need for an autoclave.

Pressure may also be applied during operation 1202. For example, a pressure may be applied on uncured composite components 136 positioned around the one or more smart bladders 144 in rigid state 174 such that uncured composite components 136 are consolidated during curing operation 118. The pressure may be applied by bagging uncured composite components 136 when positioned to form uncured composite structure 116 and applying a vacuum to bagged uncured composite components 136.

The process also may inflate the one or more smart bladders 144 in curing tool 128 while generating heat in operation 1202 when the one or more smart bladders 144 are in flexible state 176. The inflation of the one or more smart bladders 144 may push the layers of uncured composite materials against shell 154 to result in at least one of a desired shape or texture for the layers of uncured composite materials.

In one illustrative example, the process in FIG. 12 may be applied using composite structure manufacturing system 200. With this process, uncured composite components 600 may be laid up around bladder system 308 in a rigid state. As depicted, bladder 310, bladder 312, and bladder 314 in bladder system 308 may be smart bladders. Heating system 400 may generate heat to cure uncured composite components 600 without using an autoclave.

Figure 13:
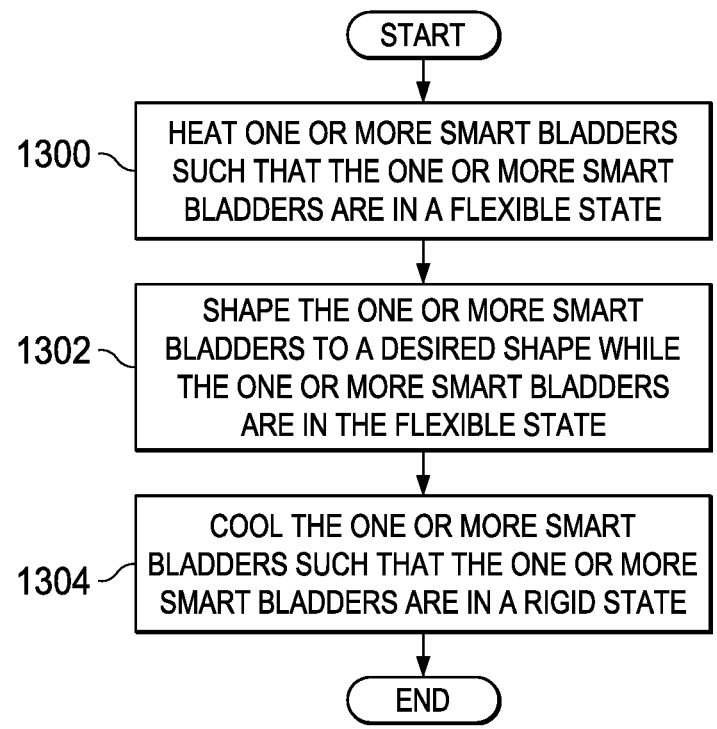
FIG. 13 is an illustration of a flowchart of a process for shaping one or more bladders in accordance with illustrative embodiment.

With reference now to FIG. 13, a flowchart of a process for shaping one or more bladders is depicted in accordance with illustrative embodiment. The process in this flowchart may be implemented in curing tool 128 to shape the one or more smart bladders 144 shown in FIG. 1.

The process may begin by heating the one or more smart bladders 144 such that the one or more smart bladders are in flexible state 176 (operation 1300). Heating the one or more smart bladders 144 may be to threshold temperature 172 causing the one or more smart bladders 144 to shift from rigid state 174 to flexible state 176.

The process may then shape the one or more smart bladders 144 to desired shape 182 while the one or more smart bladders 144 are in flexible state 176 (operation 1302). The shaping of the one or more smart bladders 144 may provide desired shape 182 for uncured composite components 136 that may be laid up on the one or more smart bladders 144. In other words, the one or more smart bladders 144 may define volume 133 in interior 126 of uncured composite structure 116 when uncured composite components 136 are laid up on the one or more smart bladders 144.

The process may then cool the one or more smart bladders 144 such that the one or more smart bladders 144 are in rigid state 174 (operation 1304) with the process terminating thereafter. By reducing the temperature of the one or more smart bladders 144 below threshold temperature 172, the one or more smart bladders 144 shifts from flexible state 176 to rigid state 174. In rigid state 174, the one or more smart bladders 144 may function as a tool to lay up uncured composite components 136 to form uncured composite structure 116.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

Figure 14:
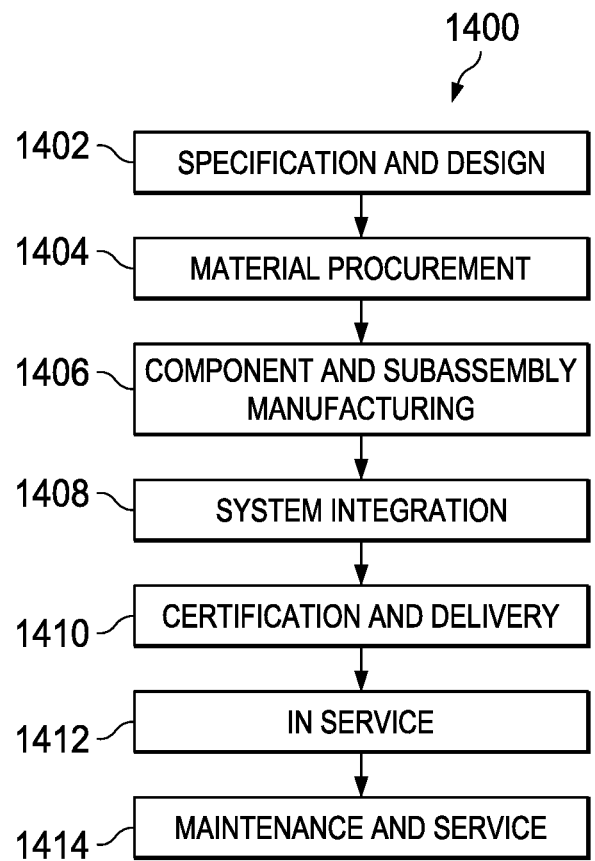
FIG. 14 is an illustration of a block diagram of an aircraft manufacturing and service method in accordance with an illustrative embodiment.
Figure 15:
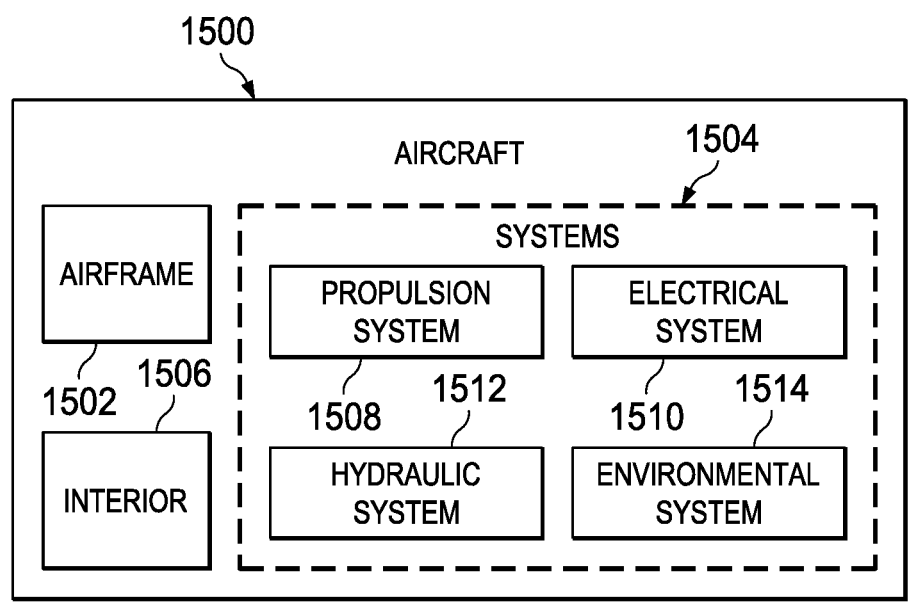
FIG. 15 is an illustration of a block diagram of an aircraft in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During preproduction, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Composite structure manufacturing environment 100 shown in FIG. 1 may be utilized during component and subassembly manufacturing 1406 to fabricate composite structures, such as a wing, an engine housing, a fuselage section, a control surface, or some other component for aircraft 1500.

Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service. For example, composite structures may be manufactured using composite structure manufacturing system 104 shown in block form in FIG. 1 to fabricate composite structures for use in routine maintenance and service 1414 for replacing components, upgrades, reconfiguration, refurbishment, or other types of routine maintenance.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. At least one of composite manufacturing system 1044 or composite structure manufacturing system 200 may be used to fabricate composite structures, such as those for airframe 1502 and interior 1506.

Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500.

Thus, the illustrative examples may provide a method and apparatus for manufacturing composite structures. One or more technical solutions in the different positive examples may provide a technical effect of reducing at least one of time, reworking operations, or cost in manufacturing complex composite structures such as unitized composite wings. In the illustrative example, composite structure manufacturing system 104 in FIG. 1 may function as a unitized composite structure manufacturing system. Using composite structure manufacturing system 104, a need to bag composite structure 102 may be avoided. Further, reworking operations and material waste from issues associated with manufacturing bagging composite structure 102 also may be avoided.

Moreover, curing tool 128 may avoid the need for placing composite structure 102 into an autoclave for curing. Further, with the use of curing tool 128, the time needed to cure composite structure 102 may be reduced as compared to currently used processes.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite structure manufacturing system comprising:
    a heating system comprising one or more heating elements configured to generate heat, wherein the one or more heating elements have a first end and a second end;
    a frame comprising a first rack that holds the first end and the second end of the one or more heating elements; and
    one or more smart bladders that encompasses the heating system in which the heating system and one or more smart bladders form a curing tool defining a volume for a composite structure when one or more smart bladders in the one or more smart bladders are in a rigid state.

2. The composite structure manufacturing system of claim 1, wherein the one or more smart bladders and the heating system are configured for positioning uncured composite components around the one or more smart bladders to form an uncured composite structure and the heating system is configured to generate heat with a thermal profile for curing the uncured composite structure during a curing operation to form the composite structure.

3. The composite structure manufacturing system of claim 2, wherein the thermal profile for the heat causes the uncured composite components for the composite structure to have one or more temperatures selected to cure the uncured composite structure.

4. The composite structure manufacturing system of claim 2, wherein the heating system comprises:
    a heat distribution system that distributes the heat with the thermal profile.

5. The composite structure manufacturing system of claim 4, wherein the heating system further comprises:
    a temperature controller connected to at least one of the one or more heating elements or the heat distribution system.

6. The composite structure manufacturing system of claim 2, further comprising:
    a slip sheet located between a first portion of the uncured composite components and a second portion of the uncured composite components in the uncured composite structure such that the first portion of the uncured composite components and the second portion of the uncured composite components are co-cured without being attached to each other in forming the composite structure.

7. The composite structure manufacturing system of claim 2, wherein the curing tool is an inner mold line tool further comprising:
    a shell that is configured to receive the uncured composite components and the curing tool, wherein the shell is an outer mold line tool.

8. The composite structure manufacturing system of claim 7, wherein a pressure is applied to the uncured composite components within the shell.

9. The composite structure manufacturing system of claim 1, wherein the first rack holding the one or more heating elements is located within an interior of a shell.

10. The composite structure manufacturing system of claim 1, further comprising:
    the frame configured to hold the heating system.

11. The composite structure manufacturing system of claim 10, wherein the frame comprises:
    the first rack configured to hold the one or more heating elements within the interior of a shell; and
    a second rack connected to the shell that holds the first rack within the interior of the shell.

12. The composite structure manufacturing system of claim 1, wherein the composite structure is selected from a group consisting essentially of a united composite structure, a wing, a horizontal stabilizer, a vertical stabilizer, an engine housing, a wing box, a control surface, and a fuselage section.

13. A composite structure manufacturing system comprising:
    a shell that is configured to receive uncured composite components and a curing tool, wherein the shell is an outer mold line tool;
    one or more smart bladders in which the uncured composite components are positioned around the one or more smart bladders;
    a heating system in which the heating system comprises:
        one or more heating elements configured to generate heat;
        a heat distribution system that distributes the heat with a thermal profile, wherein the thermal profile varies depending on the uncured composite components present in an uncured composite structure; and
        a temperature controller connected to at least one of the one or more heating elements or the heat distribution system in which the heating system is configured to generate the heat with the thermal profile for curing the uncured composite structure during a curing operation while the one or more smart bladders are in a rigid state to form a composite structure in which the thermal profile for the heat causes the uncured composite components for the composite structure to have one or more temperatures selected to cure the uncured composite structure;
    a frame configured to hold the heating system in which the frame comprises:
        a first rack that holds a first end and a second end of the one or more heating elements within an interior of the shell; and
        a second rack connected to the shell that holds the first rack within an interior of the shell, wherein:
            the one or more smart bladders encompass the heating system in which the one or more smart bladders and the frame with the heating system are configured to be received within the interior of the uncured composite structure; and
            the curing tool is formed by the heating system, the frame, and the one or more smart bladders, wherein the curing tool is an inner mold line tool that defines a volume for the composite structure in a rigid state of the one or more smart bladders;
one or more of the uncured composite components;
a first portion of the one or more of the uncured composite components;
a second portion of the one or more of the uncured composite components; and
a slip sheet located between the first portion and the second portion, such that the first portion and the second portion are co-cured without being attached to each other in forming the composite structure, and in which a pressure is applied to the uncured composite components within the shell.

14. The composite structure manufacturing system of claim 13, wherein the composite structure is selected from a group consisting essentially of a united composite structure, a wing, a horizontal stabilizer, a vertical stabilizer, an engine housing, a wing box, a control surface, and a fuselage section.

15. The composite structure manufacturing system of claim 13, wherein:
the thermal profile is configured to generate heat such that the uncured composite components have multiple temperatures selected to cure the uncured composite structure in a desired manner to form the composite structure with desired characteristics.

16. A composite structure manufacturing system comprising:
a heating system;
one or more smart bladders that encompasses the heating system, wherein:
the heating system and one or more smart bladders form a curing tool;
the curing tool defines a volume for a composite structure;
the volume is defined by a rigid state of the one or more smart bladders;
the heating system comprises one or more heating elements configured to generate heat; and
the one or more heating elements have a first end and a second end; and
a frame comprising a first rack that holds the first end and the second end of the one or more heating elements, wherein the first rack holds the one or more heating elements disposed within an interior of a shell.

17. The composite structure manufacturing system of claim 16, wherein:
the frame is configured to hold the heating system.

18. The composite structure manufacturing system of claim 16, wherein the frame comprises:
the first rack configured to hold the one or more heating elements disposed within the interior of the shell.

19. The composite structure manufacturing system of claim 16, wherein the frame further comprises:
a second rack connected to the shell that holds the first rack within the interior of the shell.

20. The composite structure manufacturing system of claim 19, wherein:
the one or more smart bladders and the heating system are configured for positioning uncured composite components around the one or more smart bladders to form an uncured composite structure.

21. The composite structure manufacturing system of claim 20, wherein:
the heating system is configured to generate heat with a thermal profile for curing the uncured composite structure during a curing operation to form the composite structure.

22. The composite structure manufacturing system of claim 20 further comprising:
a slip sheet located between a first portion of the uncured composite components and a second portion of the uncured composite components in the uncured composite structure such that the first portion of the uncured composite components and the second portion of the uncured composite components are co-cured without being attached to each other in forming the composite structure.

23. The composite structure manufacturing system of claim 20, wherein the curing tool is an inner mold line tool.

24. The composite structure manufacturing system of claim 23, wherein:
the shell is configured to receive the uncured composite components and the curing tool.

25. The composite structure manufacturing system of claim 24, wherein the shell is an outer mold line tool.

26. The composite structure manufacturing system of claim 20, wherein a pressure is applied to the uncured composite components within the shell.

27. The composite structure manufacturing system of claim 20, wherein the composite structure is one of a united composite structure, a wing, a horizontal stabilizer, a vertical stabilizer, an engine housing, a wing box, a control surface, or a fuselage section.

28. A composite structure manufacturing system comprising:
a heating system;
one or more smart bladders that encompasses the heating system, wherein:
the heating system and one or more smart bladders form a curing tool;
the curing tool defines a volume for a composite structure;
the volume is defined by a rigid state of the one or more smart bladders;
the heating system comprises one or more heating elements configured to generate heat; and
the one or more heating elements have a first end and a second end; and
a frame comprising a first rack that holds the first end and the second end of the one or more heating elements, wherein:
the first rack holds the one or more heating elements disposed within an interior of a shell; and
the shell is configured to receive uncured composite components and the curing tool.

29. The composite structure manufacturing system of claim 28, wherein:
the curing tool is an inner mold line tool; and
the shell is an outer mold line tool.

30. The composite structure manufacturing system of claim 28, wherein a pressure is applied to the uncured composite components within the shell.

31. The composite structure manufacturing system of claim 28, wherein the composite structure is one of a united composite structure, a wing, a horizontal stabilizer, a vertical stabilizer, an engine housing, a wing box, a control surface, or a fuselage section.

32. A composite structure manufacturing system comprising:
a heating system;

one or more smart bladders that encompasses the heating system, wherein:
the heating system and one or more smart bladders form a curing tool;
the curing tool defines a volume for a composite structure;
the volume is defined by a rigid state of the one or more smart bladders;
the heating system comprises one or more heating elements configured to generate heat; and
the one or more heating elements have a first end and a second end; and
a frame comprising a first rack that holds the first end and the second end of the one or more heating elements, wherein:
the first rack holds the one or more heating elements disposed within an interior of a shell;
the shell is configured to receive uncured composite components and the curing tool; and
the shell is an outer mold line tool.

33. The composite structure manufacturing system of claim 32, wherein the curing tool is an inner mold line tool.

* * * * *